July 12, 1938.  A. LERCH, JR  2,123,702
BOLSTER SPRING UNIT
Filed April 12, 1934  3 Sheets-Sheet 2
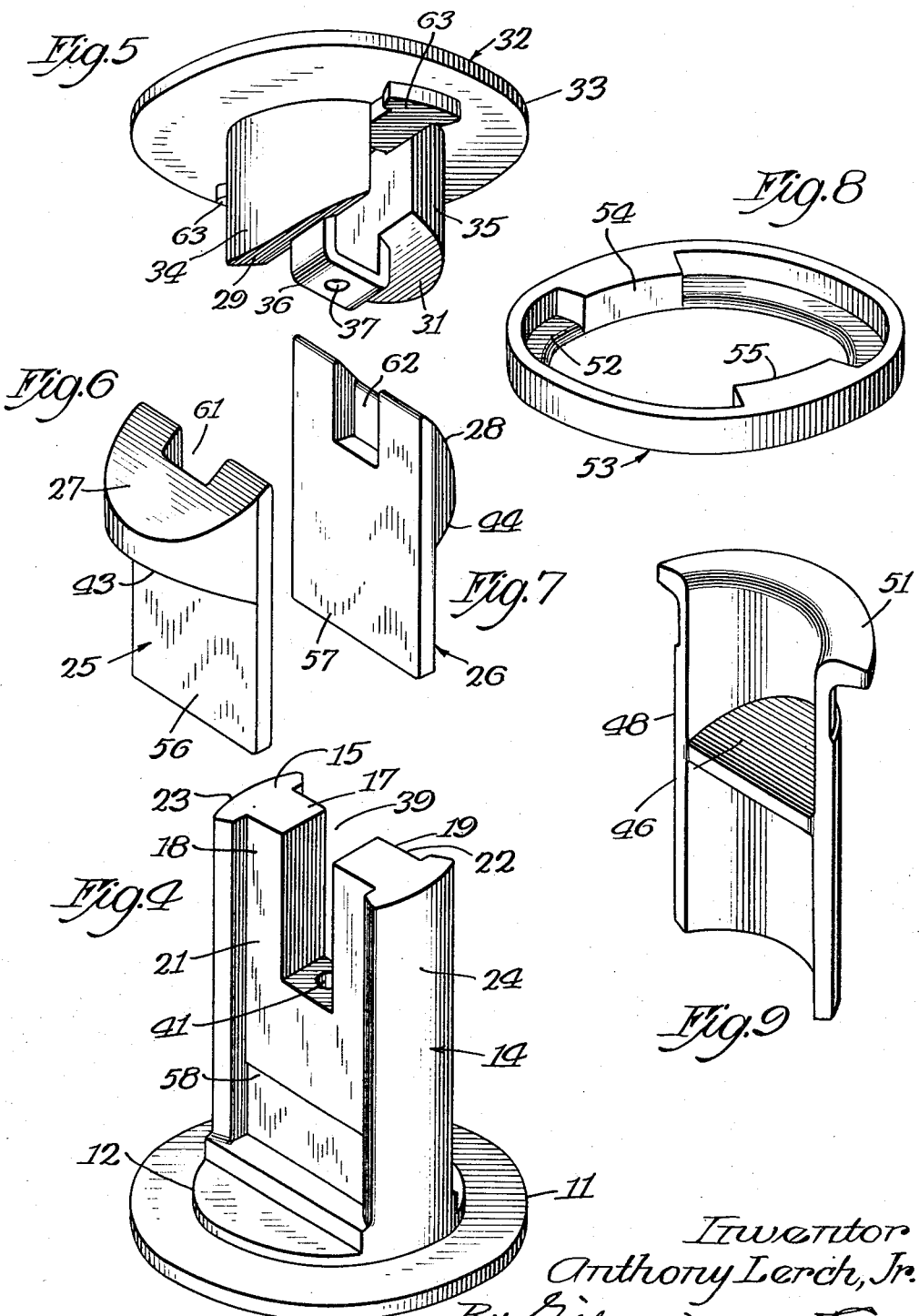
Inventor
Anthony Lerch, Jr.
By Gilson, Mann
Attys.

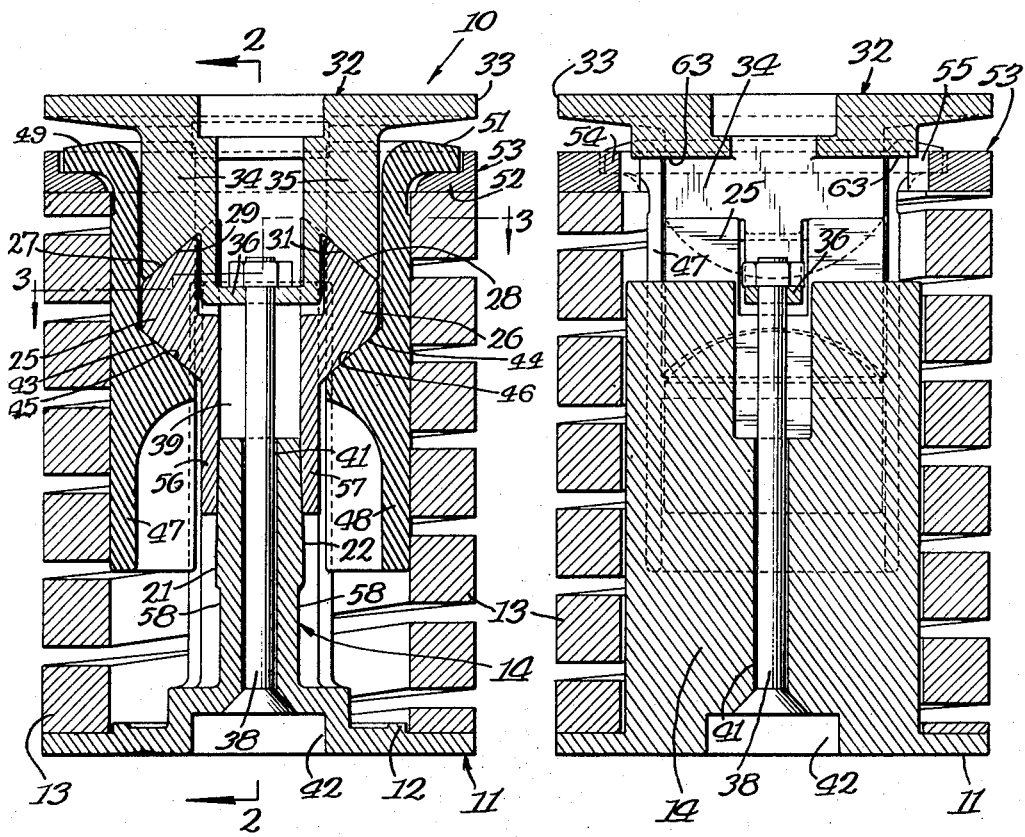

July 12, 1938.　　　A. LERCH, JR　　　2,123,702
BOLSTER SPRING UNIT
Filed April 12, 1934　　　3 Sheets-Sheet 3
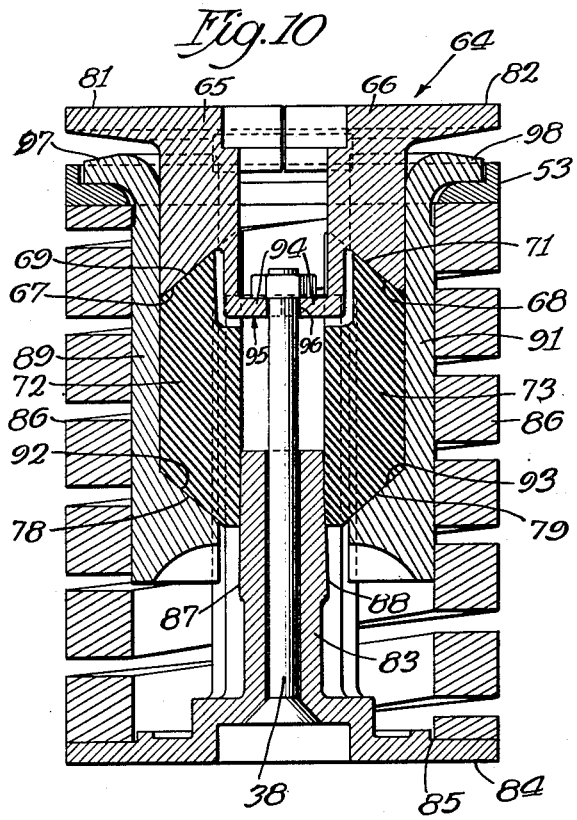
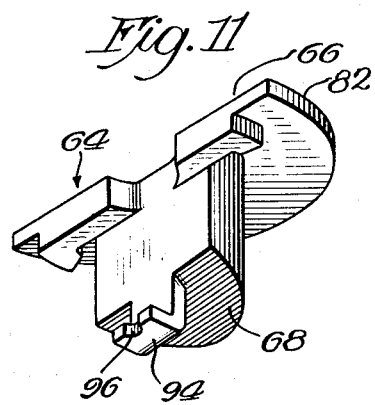
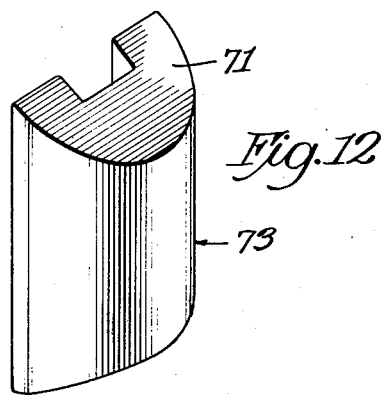
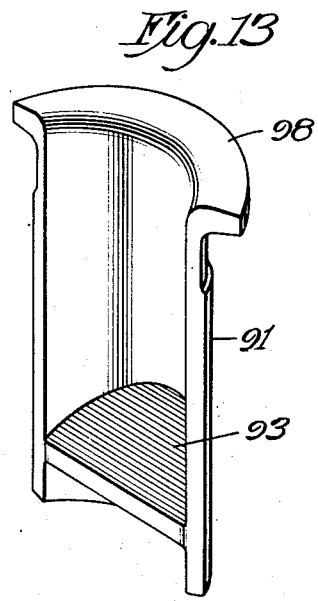
Inventor:
Anthony Lerch, Jr.
By Gillson, Mann & Cot Attys.

Patented July 12, 1938

2,123,702

UNITED STATES PATENT OFFICE 2,123,702

BOLSTER SPRING UNIT

Anthony Lerch, Jr., Chicago, Ill., assignor to Cardwell-Westinghouse Company, a corporation of Delaware Application April 12, 1934, Serial No. 720,174

9 Claims. (Cl. 267—9)

This invention relates to bolster springs for railway cars and more particularly to a combined shock absorber and resilient unit for car bodies.

One of the objects of the invention is the provision of a new and improved spring unit for supporting bolsters of railway cars having novel means for frictionally resisting the compression of the unit.

Another object of the invention is the provision of a new and improved bolster spring unit having novel means for holding the parts in proper alignment during the compression of the unit.

A still further object of the invention is the provision of a new and improved spring unit having extended friction surfaces so arranged that the parts are held in proper adjustment during the compression of the unit, with the minimum amount of wear on the friction surfaces.

A still further object of the invention is the provision of a new and improved bolster supporting unit which is simple in construction, easily assembled, inexpensive to manufacture, efficient in operation and composed of a minimum number of moving parts.

Other and further objects and advantages of the invention will appear from the following description, taken in connection with accompanying drawings, in which:

Fig. 1 is a vertical section of the spring unit taken along the line 1—1 of Fig. 3;

Fig. 2 is a section on the line 2—2 of Fig. 1;

Fig. 3 is a section on the line 3—3 of Fig. 1;

Fig. 4 is a perspective view of the friction standard;

Fig. 5 is a perspective view of the thrust member;

Fig. 6 and Fig. 7 are perspective views of the friction shoes;

Fig. 8 is a perspective view of the spring seat;

Fig. 9 is a perspective view of one of the wedge or friction members;

Fig. 10 is a vertical section of a modified form of the construction;

Fig. 11 is a perspective view of a portion of the thrust member;

Fig. 12 is a perspective view of one of the friction shoes; and

Fig. 13 is a perspective view of one of the spring friction members.

Referring now to the drawings, the reference character 10 designates a bolster spring unit comprising the base portion 11, which may be, and preferably is, circular in cross section, its external diameter being substantially that of the conventional bolster spring of a railway car, whereby the unit may be substituted for said spring. The base 11 is provided with a raised portion 12 which is adapted to engage the interior diameter of a spring 13 for positioning the same on said base, as will presently appear.

The base is provided with a friction post 14 having two enlarged segmental portions 15 and 16 connected together by a central or web portion 17 forming parallel channels having the friction surfaces 18 and 19 on opposite sides of the post. The bottoms 21 and 22 of these channels form friction surfaces which diverge slightly downwardly. The outer surfaces 23 and 24 of the enlarged segmental portions 15 and 16 are on the arc of a circle having a slightly less diameter than the internal diameter of the spring 13 whereby the post will assist in holding the spring in upright position. The spring 13 is preferably provided with a smooth inner surface. As shown, the turns of the spring are angular in cross section.

Suitable friction elements are provided for frictionally engaging the post 14 to resist compression of the unit. As shown, friction shoes 25 and 26 slidable in the grooves 18 and 19 are employed. These shoes frictionally engage the friction surfaces 21 and 22 of the post 14.

The shoes are each provided on their upper ends with inclined surfaces 27 and 28, respectively, for engaging corresponding inclined or wedging faces 29 and 31, respectively, on the depending thrust arms 34 and 35 of a thrust member 32.

The thrust member 32 is provided with a flange 33 which is adapted to support a bolster of a railway car. The friction surfaces 29 and 31 on the depending arms 34 and 35 are plane surfaces and extend straight across, and in contact with, the friction shoes 25 and 26, respectively. The thrust arms 34 and 35 are connected by a stirrup 36 having an opening 37 therein, through which a connecting rod 38 is adapted to extend. The friction post 14 is provided with a cut-out portion forming a slot 39 in which the stirrup 36 is adapted to slide during the operation of the spring unit. The post is also provided with an opening 41 through which the bolt 38 extends. The base is provided with a recess 42 for accommodating the head of the bolt and boss on the spring plate.

The friction shoes 25 and 26 are provided with downwardly facing wedge faces 43 and 44 which are adapted to be engaged by corresponding friction surfaces 45 and 46 on the spring friction or wedge members 47 and 48 which are interposed between the friction shoes and the spring 13. The outer surface of the wedge members 47 and 48 conform to the inner surface of the spring 13 and frictionally engage the same.

The upper ends of the spring friction or wedge members 47 and 48 are provided with flanges 49 and 51, respectively, which are adapted to engage the horizontal flange 52 of a spring seat 53. The spring seat is provided at opposite sides thereof with lugs 54 and 55 which are adapted to seat between the flanges 49 and 51 of the friction or wedge members 47 and 48 at opposite sides of the unit for assisting in positioning said friction members. The spring 13 is interposed between the spring seat 53 and the base 11 and is held under initial compression by the bolt 38.

Suitable means are provided for preventing the skewing or displacement of the friction shoes during the compression of the gear. In the form of construction selected to illustrate one embodiment of the invention, the shoes are provided with extensions 56 and 57, which are adapted to engage the friction surfaces 21 and 22 of the friction post 14 and afford a long bearing surface for said shoes. The friction shoes being elongated are held by the side walls of the channels from skewing or becoming displaced.

The inclined or wedging faces of the thrust member, friction shoes, and friction elements are all straight, and this materially assists in holding the parts in alignment.

In order to prevent the forming of shoulders due to the wear of the friction surface on the post, the post is preferably reduced at its lower end, as at 58. The thrust member 32 is hollow for receiving the upper end of the bolt 38 when the unit is compressed.

In the operation of the device, any shock delivered to the thrust member will cause said member to move downwardly and the inclined faces of the thrust member will force the friction shoes inwardly against the friction surface of the post and simultaneously force said shoes downwardly into frictional contact with the inclined surface of the frictional members 47 and 48. This downward movement will be resisted by the resilience of the spring 13, which, in turn, will cause the wedging surfaces between the shoes and friction members to force the shoes into frictional contact with the friction post 14 and the friction members into engagement with the interior of the spring 13.

Upon release of the gear, the resistance of the friction elements will tend to slightly retard the expansion of the spring. The parts are so constructed that while the unit will follow the upward movement of the bolster, the force of the spring will be greatly reduced by the friction of the parts, whereby a minimum impetus will be given to the upward movement of the bolster by the unit upon its rebound.

The friction shoes 25 and 26 are provided with recesses 61 and 62 for providing clearance for the stirrup 36 of the thrust member. These recesses are made sufficiently deep to compensate for the wear between the friction surface of the thrust member and shoes.

The stirrup 36 engaging in the recesses 61 and 62 tends to prevent displacement of the parts. If desired, the thrust member 32 may be provided with depending bosses 63 having substantially the form of the upper end of the friction post 14 for receiving the impact of said post when the unit goes solid.

In Figs. 10 to 13 is shown a modified form of the construction. In this form of the device, the thrust member 64 is divided vertically into two sections, 65 and 66. These members are provided on the lower ends with wedge surfaces 67 and 68 which are adapted to frictionally engage corresponding wedge surfaces 69 and 71 on friction shoes 72 and 73. The upper ends of the sections 65 and 66 of the thrust member are provided with flanges 81 and 82 which are adapted to engage a spring plate, as is usual in such constructions. The device is provided with a friction post 83, which is similar to the friction post 14. The post 83 is provided with a flange 84 for engaging the bottom spring plate on a railway truck. The flange 84 is provided with a spring seat 85 in which is seated a friction spring 86 which may be similar to the spring 13 described above. The post 83 is provided with friction surfaces 87 and 88 similar to the corresponding friction surfaces on the post 14. Spring friction members 89 and 91 are interposed between the shoes 72 and 73 and the spring 86 at opposite sides of the device. The friction members 89 and 91 differ from the corresponding spring friction members described above in that the wedging surfaces 92 and 93 thereof are arranged adjacent to their lower ends instead of being adjacent their central portion, as in the previous construction. The friction shoes 72 and 73 are also elongated in order to prevent tilting of the wedging mechanism. The thrust members 65 and 66 are each provided with depending L-shaped members 94 which together form a stirrup or base 95 corresponding to the bale or stirrup 36 described above. The meeting edges of the members 94 are provided with semi-circular recesses 96, which, when the device is assembled, form an opening for receiving the bolt 38.

The spring friction members 89 and 91 are provided at their upper ends with laterally extending flanges 97 and 98 which engage the spring seat 53, as in the previous construction. In the operation of the device during compression, the thrust member 64 is forced downwardly onto the inclined surfaces 69 and 71 of the friction shoes 72 and 73, and this movement will not only force the shoes downwardly and inwardly into frictional engagement with the post 83 but will force the sections 65 and 66 of the thrust member downwardly into frictional engagement with the spring friction members 89 and 91. The spring 86 will resist the downward movement of the spring friction members 89 and 91 and inner wedging surfaces 92 and 93 will engage the wedging faces 78 and 79 of the lower ends of the shoes 72 and 73 and force the lower ends of said shoes into frictional engagement with the post, as in the previous construction.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:—

1. A spring unit comprising a friction post, friction shoes in frictional engagement with said post, a spring surrounding said post and shoes, means comprising a plurality of friction members frictionally engaging said spring and shoes for forcing said shoes laterally against said post upon the compression of said gear, means constituting an elongation of said shoes for preventing skewing thereof, and abutments for said spring carried by said post and first-named means.

2. In a bolster spring unit, a friction post, friction shoes engaging said post, wedge members engaging said shoes, a spring surrounding said wedge members, frictionally engaging the same and yieldingly resisting their inward movement, and a pair of thrust members for forcing said shoes into frictional contact with said friction post.

3. In a bolster spring unit, a friction post, shoes frictionally engaging said post, said shoes having wedging faces at their ends, a spring surrounding said shoes and post, wedge members between said shoes and spring and frictionally engaging the same, said members having inclined faces on their inner ends for engaging the wedging faces on the inner ends of said shoes and flanges on their outer ends extending over one end of said spring, and a sectional thrust element, each section having an inclined face for engaging the wedging face on the outer end of the corresponding friction shoe, whereby when said unit is compressed, said shoes will be forced into frictional engagement with said post, said wedge members will be forced against said spring and said thrust members against said wedge members.

4. A bolster supporting unit comprising a friction post having friction surfaces thereon, a spring abutment on one end thereof, friction shoes engaging said post, a spring surrounding said post and shoes, and friction elements frictionally engaging said shoes and spring and provided at their outer ends with spring abutments, said spring reacting on said abutments for restoring the parts to normal position after compression.

5. A sectional thrust member for a bolster spring unit comprising a pair of complementary sections, each having a semi-circular flange on its outer end and an extension terminating in an L-shaped projection on its inner end, said inner end having a semi-circular recess therein, said projections when in operative position constituting a stirrup having an opening therethrough along the axis of said thrust member, and wedge faces on the inner end portion of said extension.

6. A spring unit comprising a base having a friction post provided with a plurality of friction surfaces extending longitudinally thereof, friction shoes engaging said surfaces, a thrust member engaging said shoes for assisting in forcing the same inwardly against said post, resilient means for resisting the compression of said unit, and means frictionally engaging said resilient means for assisting in forcing said shoes into frictional contact with the post for resisting the compression of said unit.

7. A spring unit comprising an upstanding post having friction surfaces thereon, shoes engaging said surfaces, each of said shoes having inner and outer wedging faces thereon, a thrust member having wedge faces for engaging the outer wedge faces of said shoes, a spring surrounding said post and shoes, and a plurality of wedge members between said spring and shoes, said wedge members having wedging surfaces engaging the inner wedging faces of said shoes.

8. In a bolster supporting spring unit, an upstanding friction post, friction shoes engaging said post, a thrust member, a plurality of wedge elements, a spring surrounding said post, shoes and elements and frictionally engaging said wedge elements, said spring being adapted to resist the compression of the unit and to restore the parts to normal position after release, and means including wedging surfaces on said thrust member and elements for engaging said shoes for forcing the same into frictional engagement with said post.

9. In a bolster supporting spring unit, an upstanding friction post, friction shoes engaging said post, a thrust member divided longitudinally into a plurality of sections, a plurality of wedge elements, one for each of said sections and provided with outwardly extending flanges, a spring surrounding said post, shoes and elements beneath said flanges and frictionally engaging said wedge elements, said spring being adapted to resist the compression of the unit and to restore the parts to normal position after release, and means including wedging surfaces on said thrust member and elements for engaging said shoes for forcing the same into frictional engagement with said post.

ANTHONY LERCH, Jr.